2,847,476

HYDRATION OF ACETYLENE USING CADMIUM PYROPHOSPHATE CATALYST

Thomas R. Steadman, Waban, Mass., assignor, by mesne assignments, to Escambia Chemical Corporation, Pace, Fla., a corporation of Delaware No Drawing. Application March 27, 1953
Serial No. 345,256

10 Claims. (Cl. 260—605)

This invention relates to a process and catalyst for the hydration of acetylenes.

A principal object of the present invention is to provide an improved catalyst and method for the hydration of acetylenes, particularly dilute streams of acetylenes.

Another object of the invention is to provide an improved method of making a cadmium pyrophosphate catalyst which is capable of high conversion of acetylenes to aldehydes and ketones, which has a long life, and which can be readily regenerated.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

The present invention is particularly directed to the hydration of acetylenes to form aldehydes and ketones. A particular aspect of the present invention is directed to an improved catalyst for achieving such hydration. This catalyst, in a preferred form, is a porous mass of cadmium pyrophosphate which has a long useful life and which can be regenerated simply and cheaply so as to provide for continued high conversion rates. In a preferred method of producing this catalyst, cadmium ammonium phosphate is heated to drive off ammonia and water, this heating being continued until the resultant cadmium phosphate has the empirical formula $Cd_2P_2O_7$. The cadmium ammonium phosphate used as a starting material is preferably produced by forming a solution of a soluble cadmium salt and phosphoric acid and adding sufficient ammonium hydroxide to the solution to make the solution alkaline. The resulting precipitate of cadmium ammonium phosphate is digested, filtered, and washed, and then heated to drive off ammonia and water vapor until the cadmium pyrophosphate ($Cd_2P_2O_7$) is obtained. This cadmium pyrophosphate has a ratio of CdO to $P_2O_5$ of 1 to 0.5.

The cadmium pyrophosphate, prepared as described above, is next mixed with a volatile organic lubricant, such as stearic acid, and then pelleted. These pellets are heated at an elevated temperature to drive off the volatile organic lubricant so that a porous hard compact is created. This resultant product has excellent mechanical strength and long life under operating conditions.

Referring now to one specific embodiment of the invention, there is illustrated in the following nonlimiting example a preferred method of practicing the present invention.

Example I

To a suspension of 385.2 grams of cadmium oxide in 1200 milliliters of water is added 500 milliliters of concentrated nitric acid with good stirring. The resulting solution of cadmium nitrate is filtered and the filtrate mixed with 235 grams of concentrated phosphoric acid (85%). This mixture is made alkaline by slowly adding concentrated ammonium hydroxide. The heavy white precipitate of cadmium ammonium phosphate thus formed is digested for 48 hours at 95° C., filtered and washed thoroughly with distilled water.

The filter cake is dried at 90° C. and then heated in a muffle furnace to 750° C. The resulting pyrophosphate is screened through a 60 mesh sieve, mixed thoroughly with 5% by weight of stearic acid and this mixture compressed into cylindrical tablets $3/16''$ x $3/16''$. The tablets are then heated in a muffle furnace to 950°–1000° C. for 4 hours and then cooled to room temperature.

The cadmium pyrophosphate catalyst prepared as above was tested for its efficiency in the hydration of a stream of dilute acetylene to acetaldehyde, the dilute acetylene stream containing about 8% by volume of acetylene. The conversion of acetylene to aldehyde operating at a space velocity of 2900 hr.$^{-1}$ at 360° C. with a water-to-acetylene mole ratio of 11 to 1 falls slowly but steadily with uninterrupted use of the catalyst. After eight hours in service it was desirable to regenerate the catalyst by flowing air through the catalyst bed at a temperature of 400°–500° C. for eight hours. This process of testing and regenerating the catalyst on an eight hour cycle basis was repeated over a period of 400 hours with the surprising result that the conversion of acetylene to total useful products increased to an average value of 90%–94%. The typical conversion to acetaldehyde was 82.7% and to crotonaldehyde 9.5% by a catalyst tested four hours after it had been regenerated. There was no apparent change in the activity of the catalyst on further use as described above.

Both the fresh and regenerated catalyst tablets are hard compacts, dead white in color, but after eight hours in service they change to a light grey color. This color is uniform throughout the body of an individual tablet, indicating that the tablets have a porous structure owing to the method used in preparing them.

Example II

A cadmium pyrophosphate catalyst prepared as described above was tested for its efficiency in the hydration of a dilute stream of higher acetylenes. The hydration reactor is a Vycor tube in which the cadmium pyrophosphate pellets are placed. Through the reactor is pressed a gas stream containing about 0.4% by volume of methyl acetylene, the remainder of the stream comprising about 48% hydrogen, 33% methane, 5% acetylene, 6% nitrogen, 4% carbon monoxide, 2% ethylene and 1% carbon monoxide by volume. Along with the gas stream about 18 moles of water for each mole of acetylenes is passed through the reactor, the vapors having a space velocity of 2900 hr.$^{-1}$ measured at 760 mm. and 360° C. The temperature of the catalyst is maintained at about 360° C. and about 62.7% of the methyl acetylene is converted to acetone.

When a similar stream of gas containing about 0.04 volume percent of vinyl acetylene was passed through a similar reactor under similar conditions, the conversion of vinyl acetylene to methyl vinyl ketone was approximately 10%.

The soluble cadmium salt may, in addition to the nitrate, be cadmium sulfate, cadmium acetate, cadmium chloride, or a cadmium phosphate from which the ammonium complex can be precipitated by concentrated ammonium hydroxide. Clearly, the starting material, instead of the cadmium oxide mentioned in Example I, can be a soluble cadmium salt (e. g., the cadmium nitrate).

While stearic acid has been illustrated as the lubricant which can be volatilized from the pelletized catalyst during the baking operation, other volatile organic lubricants, such as cornstarch, hydrogenated vegetable oil, and white mineral oil, may be employed. Equally, the specific conditions of formation of the catalyst may be varied considerably without departing from the scope of the invention. For example, the time and temperature for baking the pelleted catalyst can be varied quite widely from the specific conditions given, it only being necessary that sufficient time and temperature be employed to produce a hard compact porous pellet which can stand considerable mechanical abuse.

In a similar manner the conditions of use of the catalyst to achieve hydration of dilute acetylene streams can be varied considerably. The temperature of hydration is preferably within the range 300° C. to 400° C., while the space velocity can be varied widely from the preferred 2900 reciprocal hours. The temperature range of the reactor can vary between about 250° C. as a lower limit, with about 440° C. as an upper limit. This upper limit is largely determined by the decomposition temperature of the product. The space velocity is largely determined by economic considerations. When the space velocity is much less than about 1500 hr.$^{-1}$, the equipment size becomes unduly large. When the space velocities are greater than about 3500 hr.$^{-1}$, the yield of product begins to fall off and the smaller investment in capital equipment is outweighed by lower yields of product and recycling problems. Equally, the water-to-acetylene mole ratio can be widely varied from about 5:1 to about 20:1.

This application is a continuation-in-part of my copending application Serial No. 316,766, filed October 24, 1952, now abandoned.

Since certain changes may be made in the above process, without departing from the scope of the invention herein involved, it is intended that all matter contained in the above description shall be interpreted as illustrative and not in a limiting sense.

What is claimed is:

1. The method for hydrating acetylenes to carbonyl compounds which comprises reacting an acetylene with steam at a temperature between 300° and 440° C. in the presence of a cadmium pyrophosphate catalyst prepared by heating cadmium ammonium phosphate to remove ammonia and water, the heating being continued until the remaining cadmium phosphate has the empirical formula $Cd_2P_2O_7$, pelleting the resulting pyrophosphate with a volatile organic lubricant, and heating the pellets to form a porous catalyst structure.

2. The method of claim 1 wherein steam is reacted with a dilute stream of an acetylene.

3. The method of claim 1 wherein said cadmium ammonium phosphate is formed by adding ammonium hydroxide to a solution of a cadmium phosphate from which the ammonium complex can be precipitated.

4. The method of claim 1 wherein acetylene is reacted with steam to form acetaldehyde.

5. The method of claim 1 wherein methyl acetylene is reacted with steam to form acetone.

6. The method of claim 1 wherein vinyl acetylene is reacted with steam to form methyl vinyl ketone.

7. The method of hydrating acetylenes to carbonyl compounds which comprises reacting an acetylene with steam at a temperature between 300° C. and 440° C. in the presence of a catalyst prepared by forming a solution of a soluble cadmium salt and phosphoric acid, adding sufficient ammonium hydroxide to the solution to make the solution alkaline, separating the resultant phosphate precipitate, heating the phosphate precipitate until the remaining phosphate has achieved a constant weight, pelleting the resulting phosphate with a volatile organic lubricant, and heating the pellets to form porous catalyst structures.

8. The method of claim 7 wherein said precipitated phosphate is heated above about 750° C. until the remaining phosphate has achieved a constant weight.

9. The method of claim 7 wherein the cadmium salt is selected from the group consisting of cadmium nitrate, cadmium sulfate, cadmium chloride and cadmium acetate.

10. The method of hydrating acetylenes to carbonyl compounds which comprises forming a cadmium pyrophosphate catalyst by heating cadmium ammonium phosphate to remove ammonia and water, the heating being continued until the remaining cadmium phosphate has the empirical formula $Cd_2P_2O_7$, pelleting the resultant phosphate with a volatile organic lubricant, heating the pellets to form porous catalyst structures, passing an acetylene and steam over the catalyst while the catalyst is maintained at a temperature between about 300° C. and 440° C., continuing the reaction until the catalyst color changes from white to grey, regenerating the catalyst by heating it to a temperature between about 400° C. and 500° C. in the presence of oxygen, and again passing the acetylene and steam over the catalyst.

References Cited in the file of this patent.

UNITED STATES PATENTS

| | | |
|---|---|---|
| 2,102,751 | Scheuermann | Dec. 21, 1937 |
| 2,211,208 | Ipatieff et al. | Aug. 13, 1940 |
| 2,253,034 | Ipatieff et al. | Aug. 19, 1941 |
| 2,265,177 | Lange et al. | Dec. 9, 1941 |
| 2,367,877 | Layng | Jan. 23, 1945 |
| 2,517,720 | Schaad | Aug. 8, 1950 |

FOREIGN PATENTS

| | | |
|---|---|---|
| 346,288 | Great Britain | Apr. 7, 1931 |

OTHER REFERENCES

Mellor "Modern Inorganic Chemistry," 1939 ed., p. 647.